United States Patent
Buehren

(10) Patent No.: US 9,360,683 B2
(45) Date of Patent: Jun. 7, 2016

(54) ANTI MYOPIA LENS

(71) Applicant: CARL ZEISS MEDITEC AG, Jena (DE)

(72) Inventor: Tobias Buehren, Magdala (DE)

(73) Assignee: Carl Zeiss Meditec AG, Jena (DE)

(*) Notice: Subject to any disclaimer, the term of this patent is extended or adjusted under 35 U.S.C. 154(b) by 0 days.

(21) Appl. No.: 14/375,726

(22) PCT Filed: Jan. 31, 2013

(86) PCT No.: PCT/EP2013/051870
§ 371 (c)(1),
(2) Date: Jul. 30, 2014

(87) PCT Pub. No.: WO2013/113798
PCT Pub. Date: Aug. 8, 2013

(65) Prior Publication Data
US 2014/0375949 A1  Dec. 25, 2014

Related U.S. Application Data

(60) Provisional application No. 61/592,805, filed on Jan. 31, 2012.

(51) Int. Cl.
G02C 7/04 (2006.01)
G02C 7/02 (2006.01)

(52) U.S. Cl.
CPC .............. G02C 7/027 (2013.01); G02C 7/041 (2013.01); *G02C 7/042* (2013.01); *G02C 7/044* (2013.01); *G02C 2202/24* (2013.01)

(58) Field of Classification Search
CPC ........ G02C 7/024; G02C 7/027; G02C 7/041; G02C 7/042; G02C 7/043; G02C 7/044; G02C 7/045

USPC .............. 351/159.05, 159.73, 159.74, 159.79
See application file for complete search history.

(56) References Cited

U.S. PATENT DOCUMENTS 5,861,935 A * 1/1999 Morris .................... G02C 7/027
351/159.42
6,045,578 A 4/2000 Collins et al.
(Continued)

FOREIGN PATENT DOCUMENTS

WO  WO 2007/082268 A2  7/2007
WO  WO 2008/148084 A1  12/2008

OTHER PUBLICATIONS

Desmond Cheng et al: "Bifocal lens control of myopic progression in children", Clinical and Experimental Optometry, vol. 94, No. 1, Jan. 1, 2011, pp. 24-32, XP055060428, ISSN: 0816-4622, DOI: 10.1111/j.1444-0938.2010.00510.x table 2 p. 27, col. 3 p. 29, col. 3-p. 30, col. 1 Conclusion.

(Continued)

*Primary Examiner* — Darryl J Collins
(74) *Attorney, Agent, or Firm* — Patterson Thuente Pedersen, P.A.

(57) ABSTRACT

A pair of multifocal contact lenses, each including an optical zone portion and a stabilization zone portion. The optical zone portion has a distance prescription zone and a near prescription zone. The near prescription zone has a near vision add power appropriate to reduce accommodative effort to substantially zero for a selected working distance and convergence support having base-in prism combined between the pair of multifocal lenses appropriate to reduce convergence effort to substantially zero for the selected working distance. The stabilization zone portion is structured to maintain orientation of the pair of lenses with a base of the base in prism directed substantially nasally.

16 Claims, 6 Drawing Sheets

(56) References Cited

U.S. PATENT DOCUMENTS

| | | | |
|---|---|---|---|
| 6,082,856 A | 7/2000 | Dunn | |
| 6,139,145 A | 10/2000 | Israel | |
| 6,343,861 B1 | 2/2002 | Kris et al. | |
| 6,582,076 B1 * | 6/2003 | Roffman | G02C 7/04 351/159.12 |
| 6,752,499 B2 | 6/2004 | Aller | |
| 7,401,922 B2 | 7/2008 | Legerton | |
| 7,717,556 B1 * | 5/2010 | Walker | G02C 7/044 351/159.46 |
| 2003/0035214 A1 | 2/2003 | Pandya | |
| 2003/0058404 A1 | 3/2003 | Gwiazda | |
| 2003/0058407 A1 | 3/2003 | Aller | |
| 2004/0156013 A1 | 8/2004 | Lindacher | |
| 2004/0237971 A1 | 12/2004 | Radhakrishnan | |
| 2005/0105047 A1 | 5/2005 | Smitth, III et al. | |
| 2007/0159601 A1 | 7/2007 | Ho | |
| 2007/0296916 A1 | 12/2007 | Holden | |
| 2008/0084534 A1 | 4/2008 | Lindacher et al. | |
| 2008/0100798 A1 | 5/2008 | Gupta et al. | |
| 2009/0141235 A1 | 6/2009 | Collins | |

OTHER PUBLICATIONS

Donders. F.C. (1864), "On the Anomalies of Accommodation and Refraction of the Eye", London UK: New Sydenham Society. Chapter III.

Wiesel, T. N. & Raviola, E. (1977) Myopia and eye enlargement after neonatal lid fusion in monkeys. Nature, 266, 66-58.

Sherman, S. M., Norton, T. T. & (Casagrande, V. A. (1977) Myopia in the lid-sutured tree shrew (*Tupaia glis*). Brain Research, 124. 154-157.

Schaeffel, F, Glasser A, Howland HC. (1988) Accommodation, refractive error and eye growth in chickens. Vision Res, 28:639-57.

Rabin, J., Van Sluyters, R. C. & Malach, R. (1981). Emmetropization: A vision-dependent phenomenon? Investigative Ophthalmology & Visual Science, 20, 561-564.

Goss DA, Wickham MG. (1995) Retinal-image mediated ocular growth as a mechanism for juvenile onset myopia and for emmetropization. A literature review, Doc Ophthalmol, 90:341-75.

Wildsoet CF. (1997) Aetive emmetropization—evidence for its existence and ramifications for clinical practice. Ophthalmic Physiol Opt; 17:279-90.

Fulton AB, Hansen RM, Petersen RA. (1982) The relation of myopia and astigmatism in developing eyes. Ophthalmology; 89:298-302.

Gwiazda J, Thorn F, Bauer J, Held R. (1993) Emmetropization and the progression of manifest refraction in children followed from infancy to puberty. Clin Vis Sci; 8:337-44.

Atkinson J, Braddick O, French J. (1980) Infant astigmatism: its disappearance with age. Vision Res; 20:891-3.

Goldschmidt E. (2003) The mystery of myopia. Acta Ophthalmol Scand; 81:431-6.

Mutti Do, Zadnik K. Adams AJ. Myopia. (1996) The nature versus nurture debate goes an. Invest Opthalmol Vis Sci; 37:952-7.

Gwiazda J, Marsh-Tootle WL, Hyman I., Hussein M, Norton TT, COMET Study Group. (2002) Baseline refractive and ocular component measures of children enrolled in the correction of myopia evaluation trial (COMET). Invest Ophthalmol Vis Sci. 43:314-321.

Gwiazda J, Thorn F, Bauer J, Held R. (1993) Myopic children show insufficient accommodative response to blur. Invest Ophthalmol Vis Sci 34:690-4.

Gwiazda JE, Hyman L, Norton TT, et al. (2004) Accommodation and related risk factors associated with myopia progression and their interaction with treatment in COMET children. Invest Ophthalmol Vis Sci. 45:2143-2151.

Smith, E. L., 3rd, Kee, C. S., Ramamirtham, R., Qiao-Grider, Y., & Hung, L. F. (2005). Peripheral vision can influence eye growth and refractive development in infant monkeys. Investigative Ophthalmology and Visual Science, 46, 3965-3972.

Flitcroft DI. (2006) Dioptric space: extending the concepts of defocus to three dimensions (Abstract). Invest Ophthalmol Vis Sci; 47: (EAbstract 4778, ARVO Annual Meeting in Fort Lauderdale, Florida, USA 2006.

Collins MJ, Wildsoet CF, Atchison DA. (1995) Monochromatic aberrations and myopia. Vision Res; 35:1157-63.

Buehren T, Collins MJ, Carney L. (2003) Cortical aberrations and reading. Optom Vis Sci; 80:159-66.

* cited by examiner

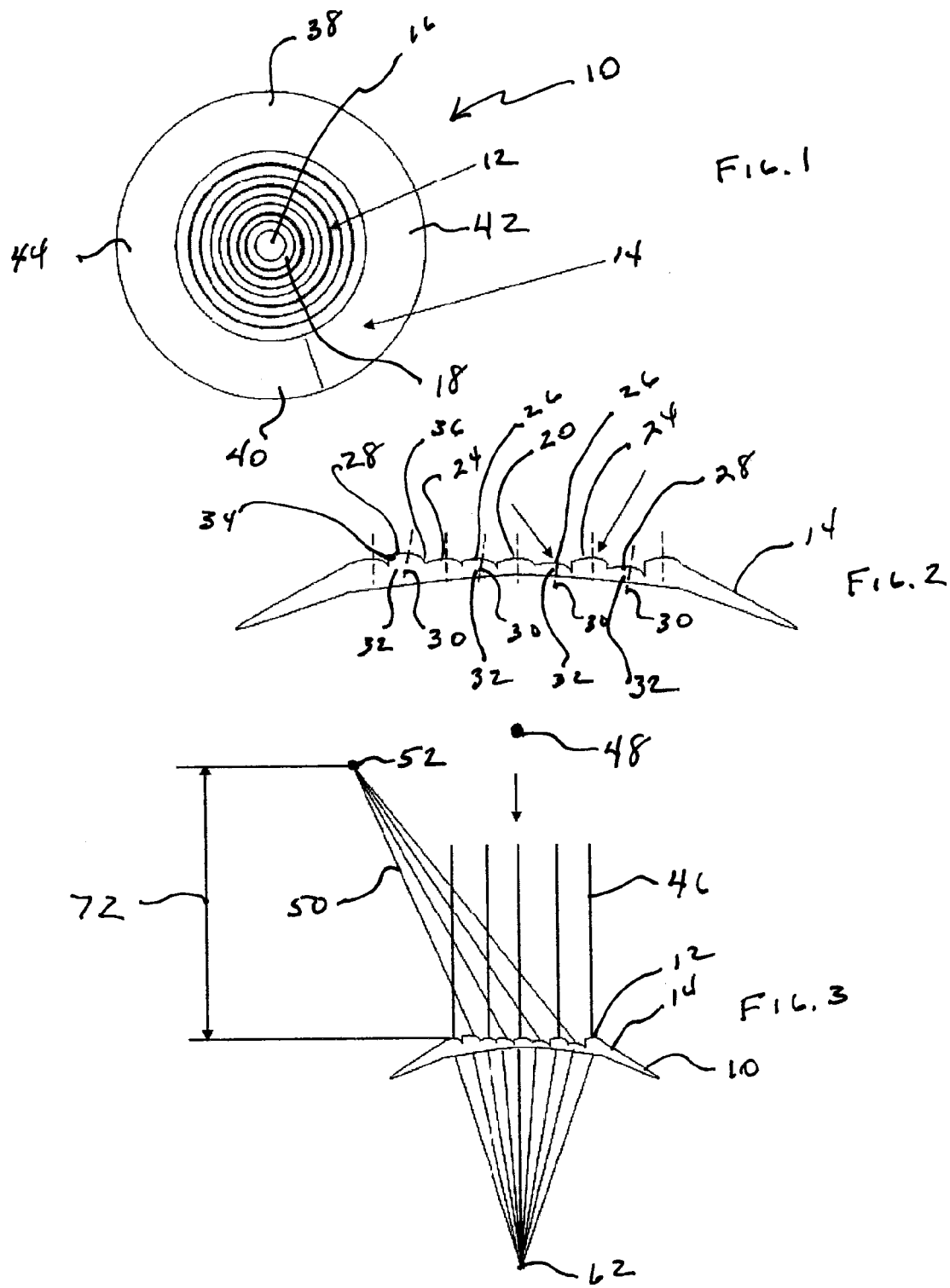

ANTI MYOPIA LENS

The present application is a National Stage entry of PCT Application No. PCT/EP2013/051870 filed Jan. 31, 2013, which claims the benefit of U.S. Provisional Application No. 61/592,805, filed Jan. 31, 2013 and entitled ANTI MYOPIA LENS, said applications being hereby incorporated by reference in their entirety.

FIELD OF THE INVENTION

The invention relates to myopia control and control of the growth of the eye and thereby aids in prevention and treatment of myopic refractive errors of the human eye by optical intervention.

BACKGROUND OF THE INVENTION

To view a near object with single clear binocular vision one must focus for the appropriate distance to see the near object clearly (accommodation) and converge (turn the eyes inwardly) so that both eyes are pointing at the near object so that the images of the near object in each eye are superimposed and thus perceived as a single object.

In 1864 Donders stated that "The use of positive or negative glasses, even after the lapse of a few hours, has an influence on the range of accommodation of the emmetropic eye." and thereby first noted the changeable relationship between accommodation and convergence. Today, proposed mechanisms or treatments to prevent myopia range include the application of spectacles and contact lenses, pharmacological treatments, biofeedback and vision training. The various methods have demonstrated varying levels of success.

More than a century later it was shown that suturing the eyelids closed in different animals induced eye growth. Probably the most convincing evidence for optical control of eye length was shown first using the chick eye model in 1988. Positive and negative power lenses were administered to chick eyes leading to compensatory eye growth due to optical blur induced by the lenses. During that time and in the following years strong evidence for compensatory blur driven eye growth or active emmetropization was accumulated.

This was furthermore supported by numerous studies on refractive error distribution in developing human eyes. e.g. 8, 9, 10. However strong evidence for a genetic component in myopia development (for a review, see Goldschmidt 2003) keeps the debate as to whether nature or nurture is the primary cause of myopia active.

One of the very early works concerned with environmental factors playing a role in the etiology of myopia was published by Tscherning in 1882. He underlined the close relationship between the amount of close work performed and the prevalence of myopia. In recent years, the connection between myopia and near visual tasks has been considered by some researchers to be the most important environmental risk factors for myopia development. The relationship between the best retinal image plane during near tasks and the state of accommodation was thought to provide clues to eye growth. Functional hyperopic blur during near work (demonstrated by lag of accommodation) was thought to be the cue that triggers myopia progression. The first large scale controlled clinical trial using progressive spectacle lenses in school children that received a lot of attention in the scientific community was conducted in the United States and was based on a theory formulated in 1993. Increased lag of accommodation due to a reduced sensitivity to blur was thought to induce hyperopic blur during close work which in turn was assumed to induce eye growth due to functional hyperopia in school children. U.S. Pat. No. 6,343,861 describes specific progressive spectacle lens designs to slow the progression of myopia. Results of the clinical trial published in 2005, however, only showed very limited clinical benefit and this clinical benefit only arose in a particular subgroup of the study population, namely esophores.

An alternative to the accommodation lag hypothesis represents the work on peripheral refraction. The study showed impressive results in infant monkeys as to how the peripheral retina contributes to emmetropization even in the presence of unrestricted central vision. The treatment method based on these findings was published earlier that year in U.S. Published Pat. App. No. 20050105047[1]. While, subsequently, the same group of researchers and others have described various treatment methods based on this proposed mechanism, initial results of clinical trials have merely shown greater success compared with the findings from previous trials.

A very interesting aspect, which was largely ignored by the research community on peripheral refraction, was added by Flitcroft in 2006. He extended the concept of defocus to the three dimensional space during far and near visual tasks. The relative hyperopic defocus that can be shown in the peripheral retina would largely be reversed during most near visual tasks in which the highest stimulus to accommodation, for example a book or computer, is usually located in the central visual field while accommodation stimuli surrounding the near visual stimulus are much smaller. Therefore, the underlying mechanism thought to be responsible for myopia progression, is not apparent during those visual tasks that have been widely associated with myopia.

An early hypothesis and a treatment method looking into the potential effects of optical higher-order aberrations and myopia progression were presented in 1995 and described in U.S. Pat. No. 6,045,578. According to this theory, a shift of spherical aberration from positive values at distance to negative values at near focus produces a cue to eye growth because paraxial rays and marginal rays entering the eye do not share a common point of focus. Similar correcting designs to control myopia were also described, while others focused on the prevention of certain spatial frequencies to slow myopia progression. U.S. Pat. App. No. 20080084534A1 proposes a lens design with vertical coma aberration for presbyopia correction and simultaneous myopia prevention. A different higher order aberration mechanism for myopia control, based on lid force induced corneal distortions during reading, is described in U.S. Pat. No. 20060884425.

Others have proposed treatment methods that were based on aberration neutralization for the control of myopia. However to date, no studies have been published for any of these proposed methods that show a clinically significant treatment effect.

U.S. Pat. No. 6,752,499[1] describes a myopia treatment method, using commercially available bifocal contact lenses, for patients who also exhibit near point esophoria. The bifocal contact lens prescription add power is based on the patient's individual near point fixation disparity. The results presented are striking, showing an almost complete arrest of myopia progression in this population compared with single vision spectacles, single vision contact lenses and even progressive spectacle lens control groups. The disadvantage of the methodology is that the myopic population to be treated must also have some form of near point esophoria or fixation disparity. No treatment method is provided for progressing myopes without esophoria.

Another aspect of the prior art presents a treatment method for patients who also exhibit near point esophoria. U.S. Pat. No. 6,752,499[1] states that: " . . . , the myopigenic effects of accommodation lag during intensive near work and hyperopic defocus are addressed by treating patients who suffer from near point esophoria" and: " . . . add powers were individually chosen to maximally reduce the amount of near point associated esophoria." This explanation does not take into account the multifocality of the optical lens design with respect to the associated hyperopic defocus induced in this population.

For a myopic patient with normal accommodation and convergence function the add power prescription while viewing a far distant target, induces a simultaneous second image that can be viewed as myopic stimulus inside the eye, therefore inhibiting myopia progression. The same myopic patient is expected to still use the distance prescription part of the lens design during close distance visual tasks due to the normal accommodative convergence to accommodation ratio. Thereby the retina is presented with a myopic stimulus of the add power part of the lens design during near visual tasks. The myopic subject uses the bifocal lens design not as it is intended for presbyopic patients that have no accommodation left. Instead normal accommodation is maintained and thereby a constant myopic stimulus during near and far distances viewing is present. Even in case of accommodative lag during near viewing one image is presented behind the retina while a second image is presented in front of the retina, which does not induce a clear stimulus to eye growth. According to the hyperopic blur stimulus hypothesis, this optical design should prevent myopia progression since a constant myopic blur stimulus is apparent. However prevention of myopia progression in myopes without near point esophoria was not shown.

In contrast, U.S. Pat. No. 6,752,499[1] discloses a treatment method applied to a study group of myopes with near point fixation disparity. The treatment method specifically intends to compensate for the fixation disparity (convergence without accommodation) with the near add power of the contact lens. Therefore, the population discussed in the '499 patent would use the bifocal lens design in the same way that a presbyopic patient would. They would use the distance zone of the bifocal lens for distance viewing and the near add power for near viewing.

In this context, hyperopic blur acts as a trigger to eye growth. The secondary image of the distance zone of the bifocal lens design induces hyperopic blur during near visual tasks, in this study population, yet prevents myopia progression according to U.S. Pat. No. 6,752,499[1]. Therefore, the theoretical mechanism assumed to cause myopia progression (i.e. hyperopic blur) appears to be wrong based on these results. Thus, there is still room for improvement in the field of myopia prevention and treatment by optical intervention.

SUMMARY OF THE INVENTION

The inventor has observed that not only accommodation but also the relationship between accommodation and convergence seems to play a role in myopia progression. In one embodiment, the invention includes a simultaneous vision multifocal lens design including convergence support. The multifocal lens design allows a patient using a pair of the multifocal lenses to look at targets at far and near distances without accommodation and without convergence of the eye axis, thereby simulating distance vision conditions for both distance and near vision needs.

According to another example embodiment, the multifocal lens design allows a patient using a pair of the multifocal lenses to look at targets at far and near distances with reduced accommodation and with reduced convergence, wherein the near vision add power and convergence support are commensurate with one another. The convergence support may be in the form of base in prism and is commensurate with the near vision add in that the convergence support is appropriate to accomplish what ocular convergence would otherwise accomplish at the focal length of the near vision add power. Thus, the amount of convergence support supplied with a given near add may be defined as being that amount of base in prism to divert light rays to substantially coincide at the focal length associated with the near add power taking into account interpupillary distance. Another way of defining convergence support is that it is the amount of base in prism to provide single binocular vision at a working distance substantially equal to the focal length of the near add power with substantially no convergence of the eyes. Thus, the amount of convergence support supplied with a given near add may be further defined as being that amount of base in prism to divert light rays that arise from an object at the focal length associated with the near add power to be brought to substantial parallelism by the convergence support taking into account interpupillary distance.

A lens design according to the invention, including a simultaneous vision near add zone with convergence support, can be achieved in the context of various bifocal or multifocal optical zone designs. Bifocal contact lens designs according to the invention can be, but are not limited to, refractive or diffractive designs, alternating concentric near-distance zones, center-near, outer-distance or center-distance, outer-zone near. Translating multifocal lens designs may also be utilized. Various stabilization zone designs can also be used in accordance with the invention to maintain desired orientation of the lens.

In one embodiment, a contact lens according to the invention includes an alternating concentric distance—near add design with convergence support wherein the contact lens includes an optical zone and a stabilization zone. The optical zone includes an optical zone for distance correction and a near add zone for near focusing. The near add zone incorporate a prismatic offset relative to the distance optical zone that compensates for the convergence effort that a patient otherwise would need to make associated with fixating a near target.

Rotational stability, which may be influenced by the prismatic offset between the optical zones, is compensated for in the stabilization zone of the contact lens design. The stabilization zone may include prism ballast, periballast, truncation, thick zones or thin zones, inferior and/or superior slab-off, chamfering, back surface toric and a combination of the foregoing.

In another example embodiment, a contact lens according to the invention includes a center distance—outer near zone design. The outer near zone incorporate a prismatic offset relative to the center distance zone that compensates for the convergence effort a patient would otherwise need to make associated with fixating a near target.

In yet another example embodiment, a bifocal contact lens includes a center near—outer distance zone design. The near add zone incorporate a prismatic offset relative to the distance optical zone that compensates for the convergence effort that a patient otherwise would need to make associated with fixating a near target.

Each of the multifocal lens designs of the present invention present a secondary image to the eye because of the contact lens design during near and distance viewing conditions.

Rotational stability, which is influenced by the prismatic offset between the optical zones, is compensated for in the stabilization zone of the contact lens design. Accordingly, the prismatic offset may be split between the right and left contact lenses so that half of the prismatic offset is located in the left contact lens and the half of the prismatic offset is located in the right contact lens. The prismatic offset may also be split unequally between the two contact lenses or may all be present in only one of the two contact lenses.

BRIEF DESCRIPTION OF THE DRAWINGS

FIG. 1 is a plan view of a multi-focal contact lens according to an example embodiment of the invention;

FIG. 2 is a cross sectional plan view of the multi-focal contact lens of FIG. 1 taken along section line 2-2;

FIG. 3 is cross sectional plan view depicting ray tracing for distant and near objects;

DETAILED DESCRIPTION

Figure 4:
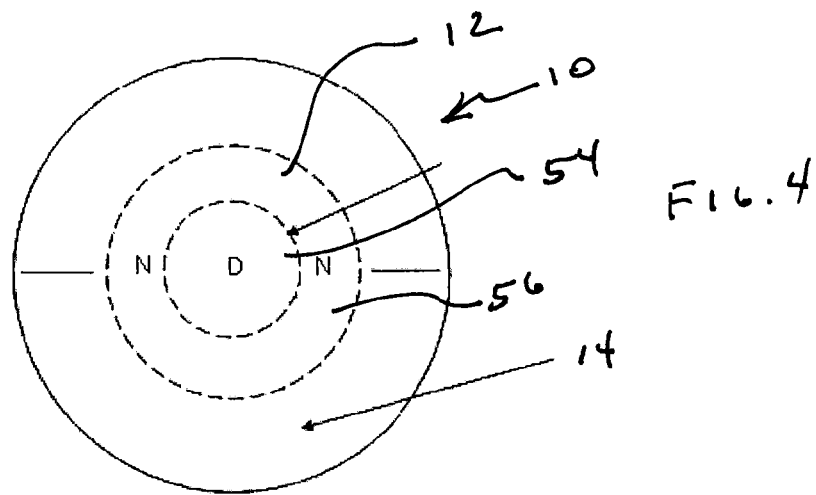
FIG. 4 is an elevational view of a multifocal contact lens according to another example embodiment of the invention including a central distance zone and an annular near optical zone.

Referring to FIG. 1, according to one example embodiment of the invention, multifocal contact lens 10 is a shell shaped generally as a portion of a sphere and presenting an optical zone 12 and a stabilization zone 14. Optical zone 12 is generally located centrally in the contact lens and stabilization zone 14 is located generally peripherally in the contact lens and has a generally annular shape. Multifocal contact lens 10 depicted in FIGS. 1-3, has an alternating concentric distance-near add design in addition to conversion support. In the depicted multifocal contact lens 10, optical zone 12 includes a plurality of distance prescription zones 16 and near prescription zones 18. Distance prescription zones 16 include central distance zone 20, first annular distance zone 22 and second annular distance zone 24. In the example embodiment depicted, near prescription zones includes first annular near zone 26 and second annular near zone 28.

Near prescription zones 18 include prismatic correction 32 having nasally located base 34 and temporally located apex 36.

Stabilization zone 14 stabilizes and orients multifocal contact lens 10 and counteracts the tendency of the weight of the nasally located base 34 to cause the portion of the contact lens that is desired to be nasally located to rotate toward the ground because of gravitational effects on nasally located base 34.

Accordingly, stabilization zone 14 may incorporate a number of techniques to control the orientation of multifocal contact lens 10. Stabilization zone 14 generally includes superior portion 38, inferior portion 40, nasal portion 42 and temporal portion 44. Accordingly, multifocal contact lens 10 will include right eye designs and left eye designs to accomplish convergence support according to the invention.

For example, stabilization zone 14 may include a prism ballast wherein inferior portion 40 of stabilization zone 14 is thicker than superior portion 38 of stabilization zone 14. In this embodiment the greater mass of inferior portion 40 causes inferior portion 40 to take a location at the lower edge as directed by gravity. In this circumstance, superior portion 38 of stabilization zone 14 is thinner and stabilization also occurs during the act of blinking because the upper lid squeezes the thicker part of the lens in an inferior direction.

A related stabilization approach known to those skilled in the art is a periballast which is a lenticulated lens having a high minus carrier the superior portion of which has been largely removed. Generally, a peribaliast stabilization is lenticulated with thinning in superior portion 38 and thickening in inferior portion 40, thus having greater weight in inferior portion 40. Stabilization zone 14 may also optionally include truncation wherein inferior portion 40 has a flat profile which contacts the lower eyelid thus increasing stabilization.

Stabilization zone 14 may also include thin zones and thick zones, sometimes also referred to as dynamic stabilization or a double slab-off. In these circumstances, superior portion 38 and inferior portion 40 are thinned relative to nasal portion 42 and temporal portion 44. Thus, thinner inferior portion 40 and thinner superior portion 38 tend to maintain position under the pressure of the eye eyelids while thicker nasal portion 42 and temporal portion 44 tend to position themselves at the three and nine o'clock position, thus stabilizing multifocal contact lens 10.

Chamfering presents a variation of the thin zone approach wherein inferior portion 40 and superior portion 38 are thinner than nasal portion 42 and temporal portion 44. One of ordinary skill in the art will recognize that combinations of these various stabilization approaches may be utilized in stabilization zone 14 in the contact lens design according to the invention. Whatever stabilization approach is utilized in stabilization zone 14, it must be sufficient to overcome the tendency of gravity affecting prismatic correction 32 to direct nasally located base 34 downwardly to prevent nasally located base 34 from positioning inferiorly rather than nasally. Any combination of these stabilization approaches may be utilized with multifocal contact lens 10 or the other example embodiments of the invention disclosed herein.

Referring particularly to FIG. 3, the form of convergence support 30 in the form of prismatic connection 32 is depicted for a right eye contact lens. Distant light rays 46 arising from distant object 48 passing through distance prescription zones 16 are focused by the combination of distance prescription zones 16 and the wearer's eye (not shown) at a focal point. Near light rays 50 arising from near object 52 are deflected by prismatic correction 32 to focus at a similar location coincident with distant light rays 46 from distant object 48 without the need for convergence effort on the part of the patient.

Figure 5:
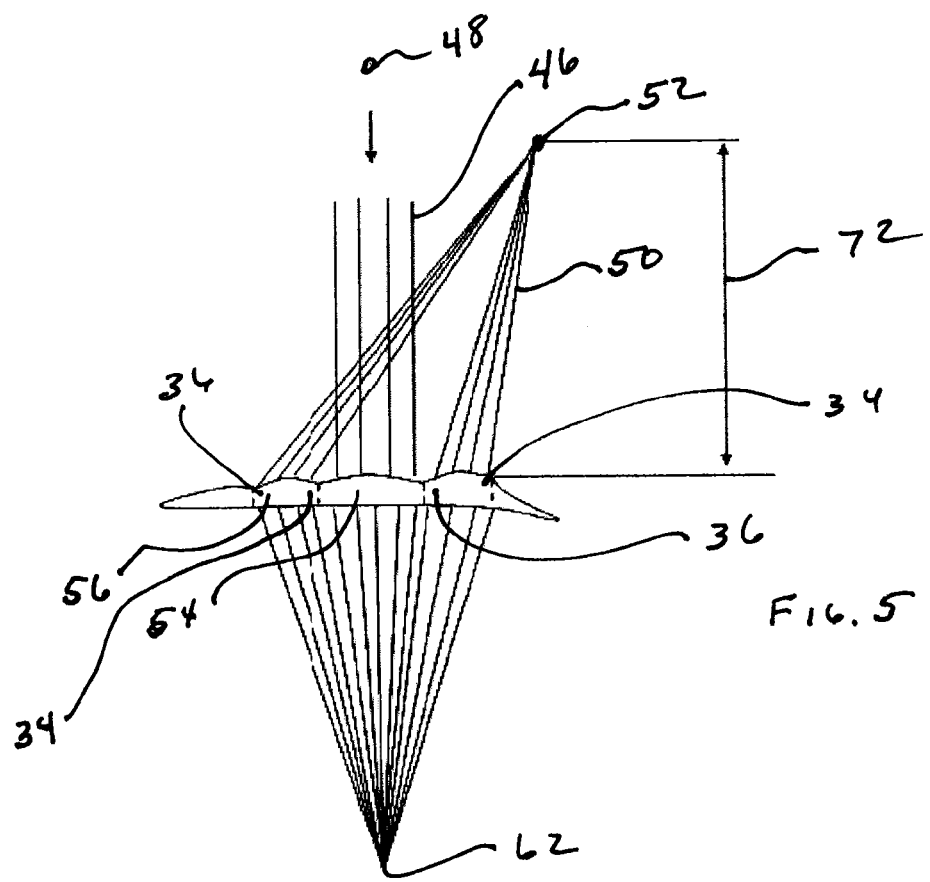
FIG. 5 is a cross sectional view of the multifocal contact lens of FIG. 4 taken along section line 5-5 including ray tracing for viewing of distance and near objects.

Referring to FIGS. 4 and 5, another embodiment of multifocal contact lens 10 is depicted. In the depicted embodiment, optical zone 12 includes central distance zone 54 and annular near zone 56. Stabilization zone 14 may be similar to that described above. Annular near zone 56 includes convergence support 30 in the form of prismatic correction 32. Prismatic correction 32 has nasally located base 34 and temporally located apex similar to the embodiment described above. Referring particularly to FIG. 5, the effect of prismatic correction 32 is depicted including distant light rays 46 from distant object 48 and near light rays 50 from near object 52. FIG. 5 depicts convergence support 30 for multifocal contact lens 10 worn on a left eye (not shown) whereas FIG. 3 depicts conversion support 30 for multifocal contact lens 10 worn on a right eye (not shown). As discussed above, conversion support 30 according to the invention, utilizes base in or nasally located base 34 prism.

Figure 6:
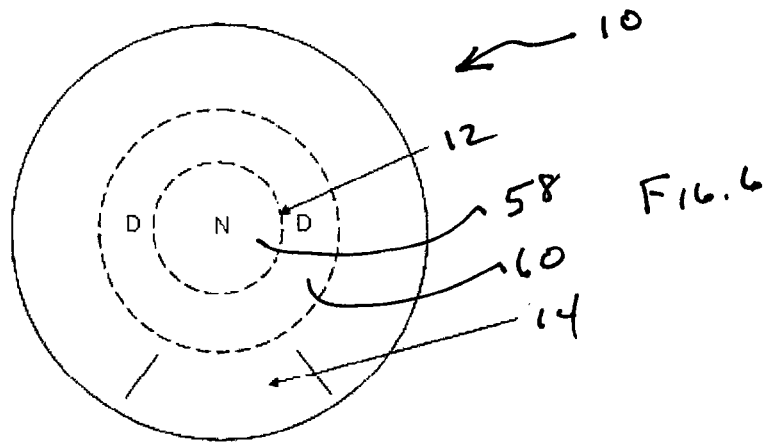
FIG. 6 is an elevational view of a multifocal contact lens according to another example embodiment of the invention including a central near optical zone and an annular distance optical zone.
Figure 7:
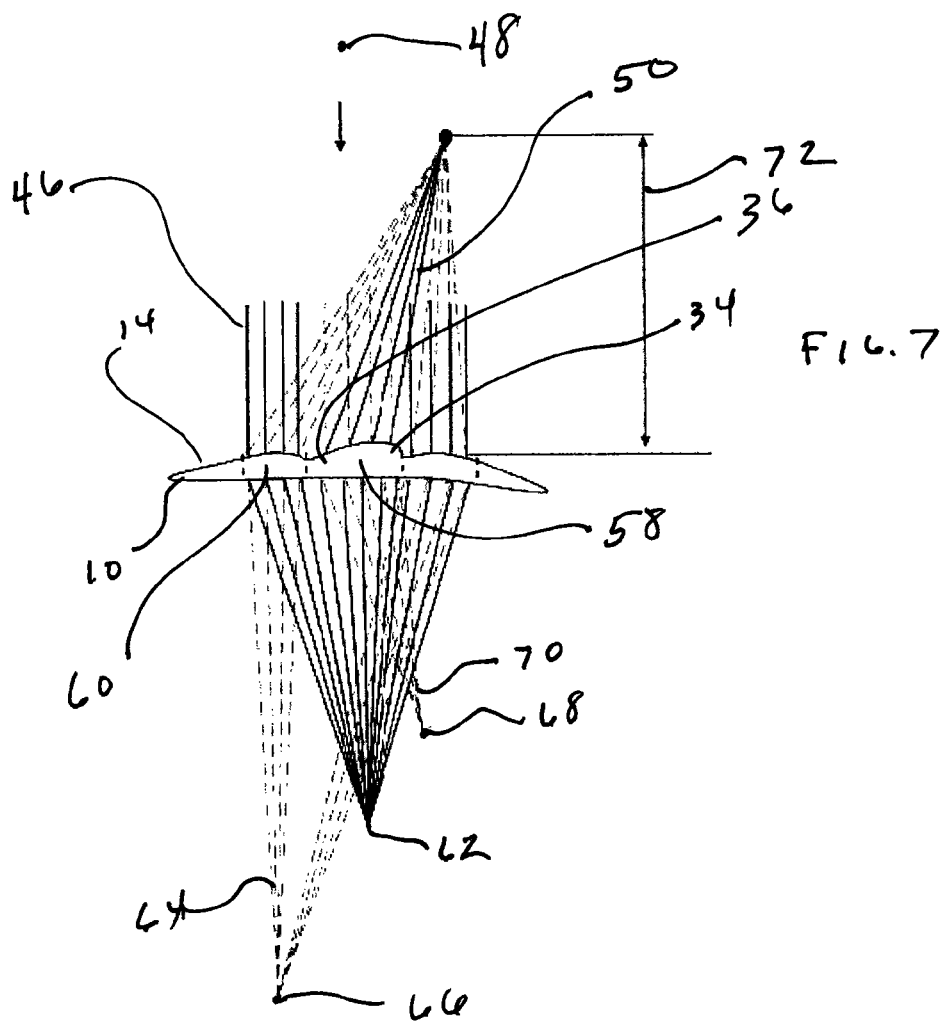
FIG. 7 is a cross sectional view of the multifocal contact lens of FIG. 6 including ray tracing for distant and near objects as well as a depiction of secondary images formed during near and distance visual tasks.
Figure 8A:
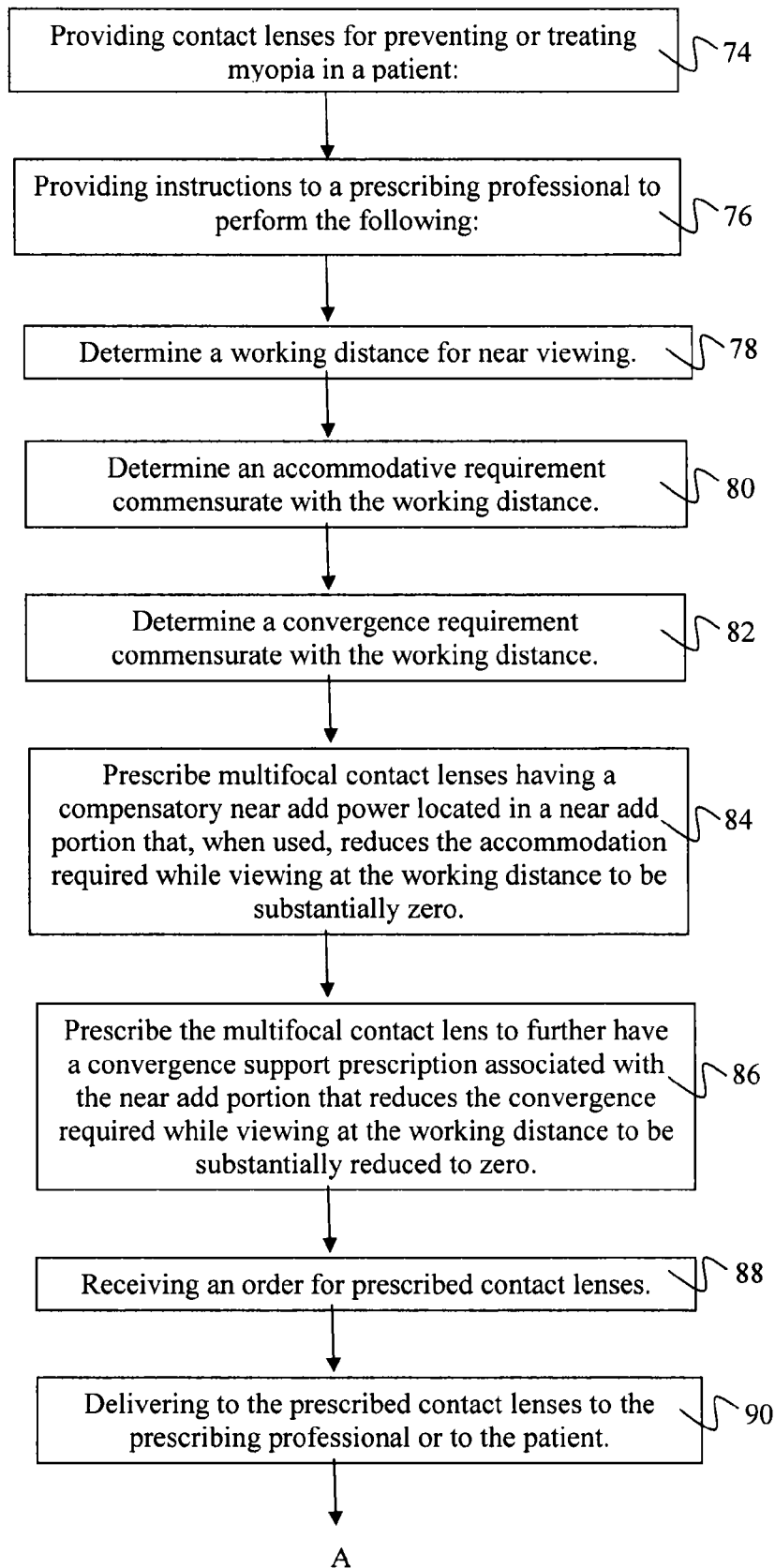
FIGS. 8A-8F are flowcharts depicting a method according to an embodiment of the invention.
Figure 8B:
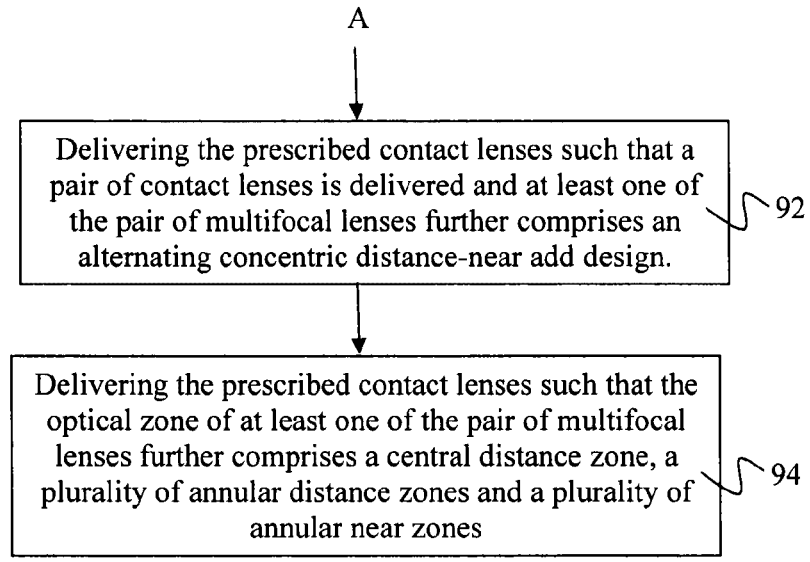
Figure 8C:
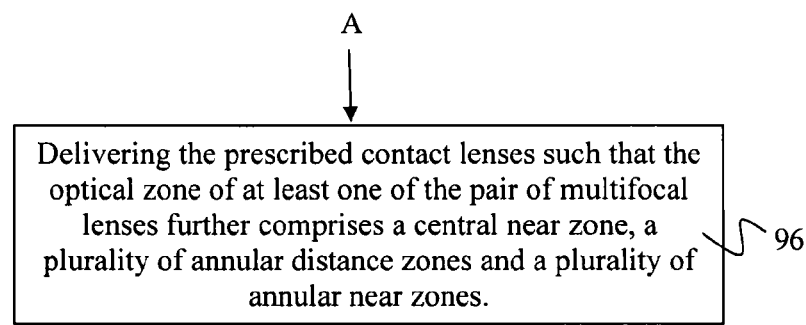
Figure 8D:
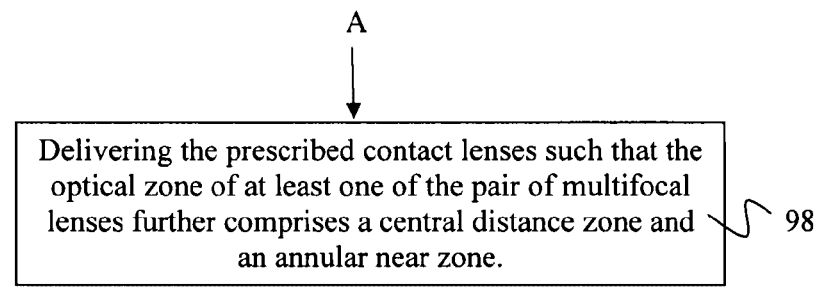
Figure 8E:
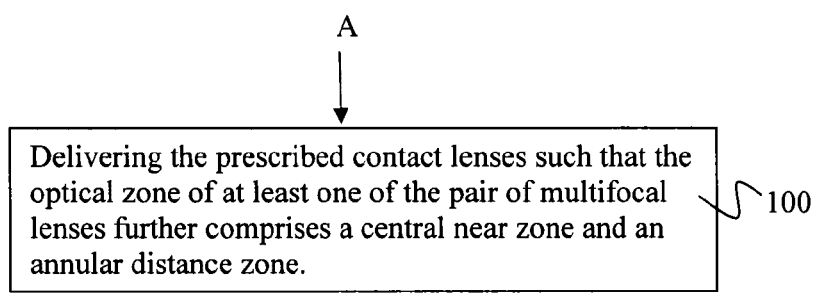
Figure 8F:
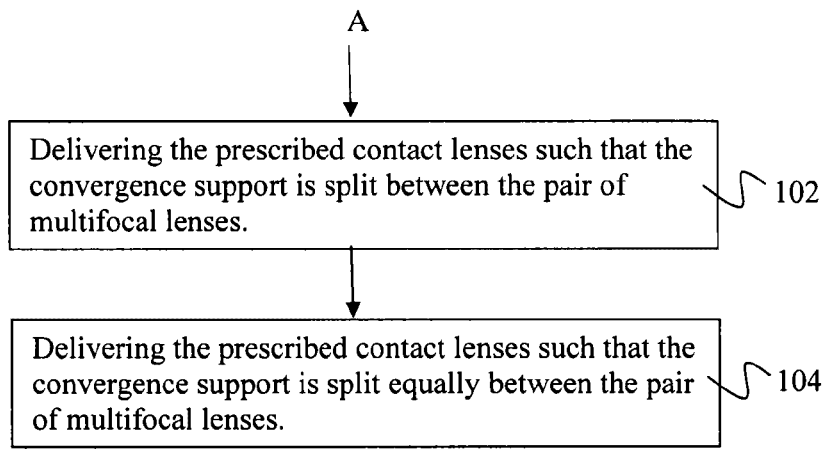

Referring particularly to FIGS. 6 and 7, another embodiment of multifocal lens is depicted. In the depicted embodiment, optical zone 12 includes central near zone 58 and annular distance zone 60.

Referring to particularly to FIG. 7, distant light rays 46 and near light rays 50 are depicted as solid lines and demonstrate the formation of primary image 62 by distance light rays 46 from distant object 48 passing through annular distance zone 60 and near light rays 50 from near object 52 passing through central near zone 58. FIG. 7 also depicts the formation of first secondary image 64, formed by the passage of first secondary image light rays 66 from near object 52 through annular distance zone 60 during a near visual task. In addition, FIG. 7 depicts second secondary image 68 formed by the passage of second secondary image light rays 70 through central near zone 58.

According to the present invention, the presence of first secondary image 64 and second secondary image 66 located in front of and behind primary image 62 are expected not to induce a clear stimulus to eye growth. The inventor of the invention believes that this will aid in preventing the development of myopia or reduce the progression of myopia with the use of contact lenses according to embodiments of the invention.

Multifocal contact lens 10 according to the present invention may be made by any known technique in the form of rigid or soft contact lenses. Lenses may be made of various known polymers as well as new polymers that may be become available including but not limited to hydrophilic polymers, rigid polymers and fluoropolymers. Lenses may be made by molding, cast molding, spin casting, lathe cutting, CNC machining and any other technique known to those of skill in the art. Contact lenses according to the present invention, may include simultaneous vision lenses, as depicted and described in the present application, but may also include alternating vision multifocal contact lenses in which the contact lens translates so that viewing of distant and near objects is accomplished by viewing through different portions of the contact lens.

Referring to FIGS. 8A-8F, the invention, in another embodiment, also includes a method of prescribing multifocal contact lens 10 for the treatment or prevention of myopia. In an example embodiment, the method of treating or preventing of myopia may include determining working distance 72 for near viewing, then determining an accommodated requirement commensurate with working distance 72. This may be followed by determining a convergence requirement commensurate with the working distance 72. The method further includes prescribing multifocal contact lenses 10 having a near add power that when used reduces the accommodation required while viewing at the working distance 72 to substantially zero. The method further includes prescribing the multifocal contact lens to further have a convergence support prescription that reduces the convergence required while viewing at the near working distance 72 to be substantially reduced to zero. The present invention also includes a method of providing contact lenses for preventing or treating myopia in a patient 74 including providing instructions to a prescribing professional to perform the following 76:

determination of a working distance for near viewing 78;

determination of an accommodative requirement commensurate with the working distance 80;

determining an conversion requirement commensurate with a working distance 82; and prescribing a multifocal contact lens having a compensatory near add power located in the near add portion that when used, reduces the accommodation required for viewing at the working distance to be substantially zero 84.

The method further includes instructing the prescribing professional to prescribe the multifocal contact lens to have a convergence support prescription associated with the near add portion that reduces the convergence required while viewing at the working distance to be substantially zero 86. The method further includes receiving an order for prescribed contact lenses and distributing the prescribed contact lenses 88 to the prescribing professional or to a patient 90. The method further includes the delivery of the prescribed contact lenses such that a pair of contact lenses is delivered and at least one of the pair of multifocal lenses further comprises an alternating concentric distance-near add design 92. The method further includes the delivery of the prescribed contact lenses such that the optical zone of at least one of the pair of multifocal lenses further comprises a central distance zone, a plurality of annular distance zones and a plurality of annular near zones 94. The method further includes the delivery of the prescribed contact lenses such that the optical zone of at least one of the pair of multifocal lenses further comprises a central near zone, a plurality of annular distance zones and a plurality of annular near zones 96. The method further includes the prescribed contact lenses such that the optical zone of at least one of the pair of multifocal lenses further comprises a central distance zone and an annular near zone 98. The method further includes the delivery of the prescribed contact lenses such that the optical zone of at least one of the pair of multifocal lenses further comprises a central near zone and an annular distance zone 100.

The method further includes the delivery of the prescribed contact lenses such that the convergence support is split between the pair of multifocal lenses 102. The method may further include delivery of the prescribed contact lenses such that the convergence support is split equally between the pair of multifocal lenses 104.

The providing of instructions to the prescribing professional may be done verbally, in print, by public presentation, over a website or by other electronic means. The delivery of the prescribed contact lenses may be by any normal delivery channel including mail, private carrier, delivery by courier or by hand. In addition, delivery may include a local manufacturing process where the contact lenses are manufactured in close proximity to the prescribing professional or to the patient for delivery.

According to another example embodiment, a method according to the invention includes instructing a prescribing professional to prescribe the near vision add power and convergence support such that they are commensurate with one another. The convergence support may be in the form of base in prism and is commensurate with the near vision add in that the convergence support is appropriate to accomplish what ocular convergence would otherwise accomplish at the focal length of the near vision add power. Thus, the amount of convergence support supplied with a given near add may be defined as being that amount of base in prism to divert light rays that arise from an object at the focal length associated with the near add power to be brought to substantial parallelism taking into account interpupillary distance. Another way of defining convergence support is that it is the amount of base in prism to provide single binocular vision at a working distance substantially equal to the focal length of the near add power with substantially no convergence of the eyes. Thus, the amount of convergence support supplied with a given near add may also be thought of as being that amount of base in prism to divert light rays to substantially coincide at the focal length associated with the near add power taking into account interpupillary distance.

Examples:

For example, let us consider an individual who has a near working distance 72 of 40 cm. In accordance with an embodiment of the present invention, this individual would receive a +2.50 diopter near add over the distance prescription in multifocal contact lens 10 according to the invention. The near prescription zone 18 would also have base-in prism in each contact lens for each eye of approximately 7.5 prism diopters base-in (a total of 15 prism diopters base in) to provide convergence support for conversion required at 40 cm. This example assumes an interpupillary distance of approximately 60 millimeters and a desire to reduce accommodative effort and convergence effort to substantially zero. As known to those skilled in the art, convergence required varies with interpupillary distance. A larger interpupillary distance increases convergence demand at a given working distance 72 as compared to a smaller interpupillary distance.

In another example, for a working distance 72 of 50 cm, an accommodative demand would be two diopters, thus requiring a +2.00 diopter reading add over the distance prescription and the convergence requirement would be 12 prism diopters for the two eyes assuming a 60 millimeter interpupillary distance. Accordingly, the reading add would be +2.00 with convergence support 30 of 12 prism diopters between the two eyes. It is convenient to split convergence support 30 prismatic correction 32 between the two contact lenses resulting in a six prism diopters base-in the near prescription zone 18 of each multifocal contact lens 10 in accordance with the invention. Adjustments can be made for significant variations in interpupillary distance from the assumed 60 millimeters herein by calculations and/or measurement known to those skilled in the art.

In another example, wherein partial accommodating and convergence support is desired, for a working distance 72 of 40 cm, and, an accommodative demand would be two and one half diopters, thus requiring a +2.50 diopter reading add over the distance prescription and the convergence requirement would be 15 prism diopters for the two eyes assuming a 60 millimeter interpupillary distance. However, the reduction of accommodative effort and convergence effort to substantially zero may not be required to effectively reduce myopia progression or to treat myopia. Accordingly, the reading add may be +2.00 with convergence support 30 of 12 prism diopters between the two eyes thus reducing accommodative effort to 0.50 diopters while reducing convergence effort to three prism diopters. It is convenient to split convergence support 30 prismatic correction 32 between the two contact lenses resulting in a six prism diopters base-in the near prescription zone 18 of each multifocal contact lens 10 in accordance with the invention. Adjustments can be made for significant variations in interpupillary distance from the assumed 60 millimeters herein by calculations and/or measurement known to those skilled in the art.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A method of providing contact lenses for preventing or treating myopia in a patient, comprising:
   providing instructions to a prescribing professional to perform the following:
      determine a working distance for near viewing;
      determine an accommodative requirement commensurate with the working distance;
      determine a convergence requirement commensurate with the working distance;
      prescribe a pair of multifocal contact lenses having a compensatory near add power located in a near add portion that, when used, reduces the accommodation required while viewing at the working distance to be substantially zero;
      prescribe the multifocal contact lens to further have a convergence support prescription associated with the near add portion that reduces the convergence required while viewing at the working distance to be substantially reduced to zero;
   providing the contact lenses by receiving an order for prescribed contact lenses;
   manufacturing or selecting the prescribed contact lenses to include compensatory near add structures to meet the near add power prescribed and to have convergence support structures to meet the convergence support prescription prescribed; and
   delivering the prescribed contact lenses to the prescribing professional or to the patient.

2. The method as claimed in claim 1, further comprising delivering the prescribed contact lenses such that a pair of contact lenses is delivered and at least one of the pair of multifocal lenses further comprises an alternating concentric distance-near add design.

3. The method as claimed in claim 2, further comprising delivering the prescribed contact lenses such that the optical zone of at least one of the pair of multifocal lenses further comprises a central distance zone, a plurality of annular distance zones and a plurality of annular near zones.

4. The method as claimed in claim 1, further comprising delivering the prescribed contact lenses such that the optical zone of at least one of the pair of multifocal lenses further comprises a central near zone, a plurality of annular distance zones and a plurality of annular near zones.

5. The method as claimed in claim 1, further comprising delivering the prescribed contact lenses such that the optical zone of at least one of the pair of multifocal lenses further comprises a central distance zone and an annular near zone.

6. The method as claimed in claim 1, further comprising delivering the prescribed contact lenses such that the optical zone of at least one of the pair of multifocal lenses further comprises a central near zone and an annular distance zone.

7. The method as claimed in claim 1, further comprising delivering the prescribed contact lenses such that the convergence support is split between the pair of multifocal lenses.

8. The method as claimed in claim 7, further comprising delivering the prescribed contact lenses such that the convergence support is split equally between the pair of multifocal lenses.

9. A method of providing contact lenses for preventing or treating myopia in a patient, comprising:
   providing instructions to a prescribing professional to perform the following:
      determine a desired near add power for near viewing;

determine a convergence support commensurate with the near add power by calculating a convergence requirement for a distance equal to the focal length associated with the near add power;

prescribe base in prism for the convergence support substantially equal to the convergence requirement;

receiving an order for prescribed contact lenses;

manufacturing or selecting the prescribed contact lenses to include compensatory near add structures to meet the near add power prescribed and to have convergence support structures to meet the convergence support prescription prescribed; and delivering the prescribed contact lenses to the prescribing professional or to the patient.

10. The method as claimed in claim 9, further comprising delivering the prescribed contact lenses such that a pair of contact lenses is delivered and at least one of the pair of multifocal lenses further comprises an alternating concentric distance-near add design.

11. The method as claimed in claim 10, further comprising delivering the prescribed contact lenses such that the optical zone of at least one of the pair of multifocal lenses further comprises a central distance zone, a plurality of annular distance zones and a plurality of annular near zones.

12. The method as claimed in claim 9, further comprising delivering the prescribed contact lenses such that a pair of contact lenses is delivered and the optical zone of at least one of the pair of multifocal lenses further comprises a central near zone, a plurality of annular distance zones and a plurality of annular near zones.

13. The method as claimed in claim 9, further comprising delivering the prescribed contact lenses such that a pair of contact lenses is delivered and the optical zone of at least one of the pair of multifocal lenses further comprises a central distance zone and an annular near zone.

14. The method as claimed in claim 9, further comprising delivering the prescribed contact lenses such that a pair of contact lenses is delivered and the optical zone of at least one of the pair of multifocal lenses further comprises a central near zone and an annular distance zone.

15. The method as claimed in claim 9, further comprising delivering the prescribed contact lenses such that a pair of contact lenses is delivered and the convergence support is split between the pair of multifocal lenses.

16. The method as claimed in claim 15, further comprising delivering the prescribed contact lenses such that the convergence support is split equally between the pair of multifocal lenses.

* * * * *